March 21, 1950 M. P. KOUZMINSKY 2,501,469
PHOTOGRAPHIC ENLARGER AND CAMERA
Filed June 19, 1947 6 Sheets-Sheet 1
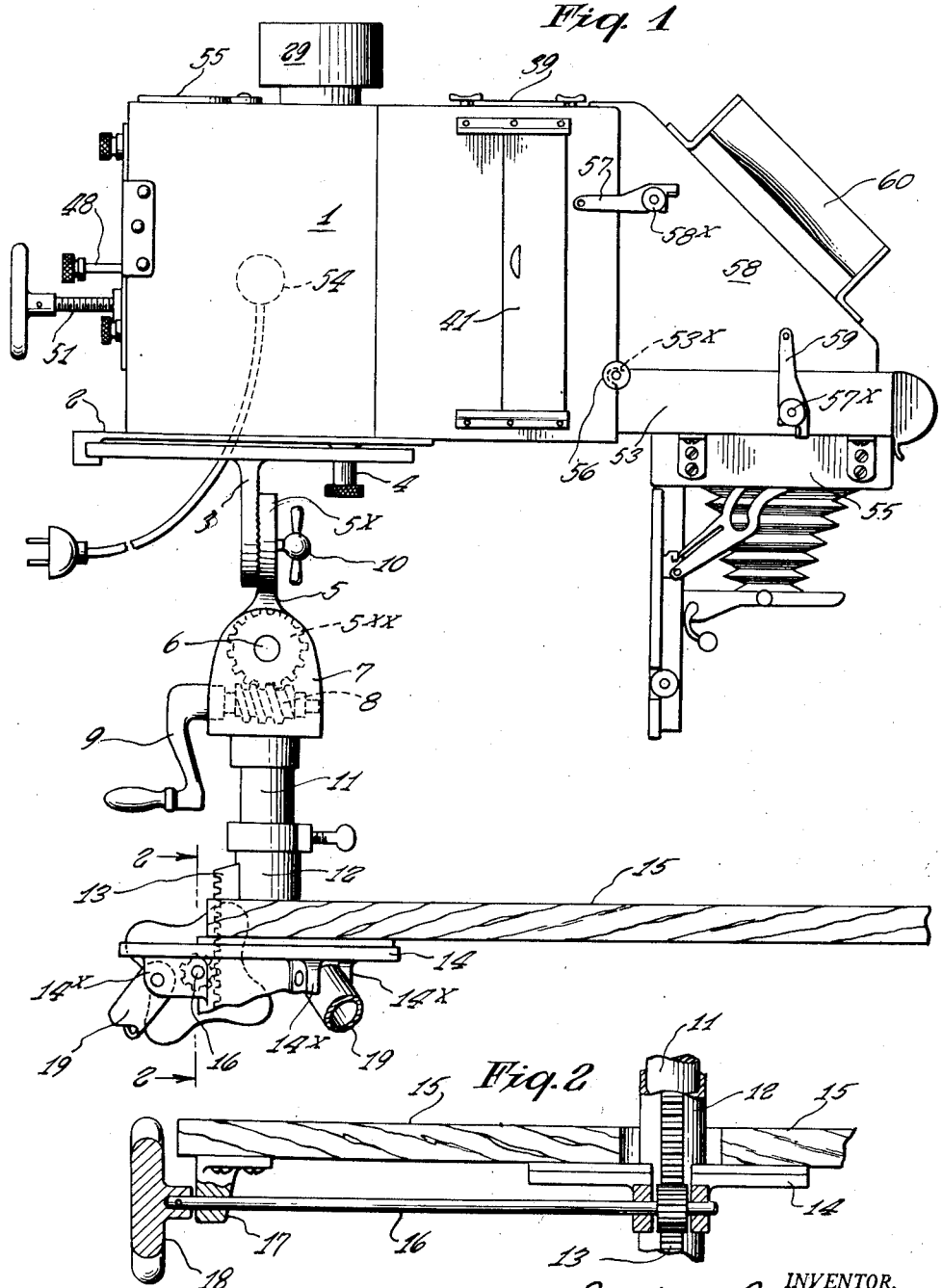

March 21, 1950   M. P. KOUZMINSKY   2,501,469
PHOTOGRAPHIC ENLARGER AND CAMERA
Filed June 19, 1947   6 Sheets-Sheet 2
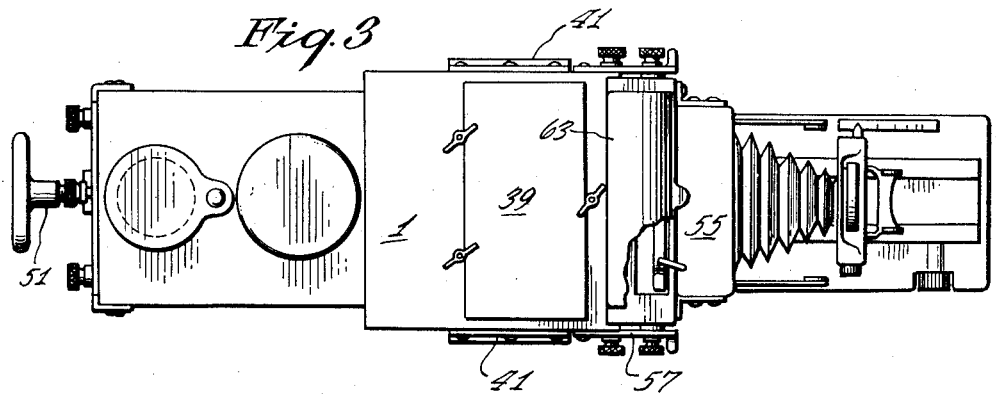
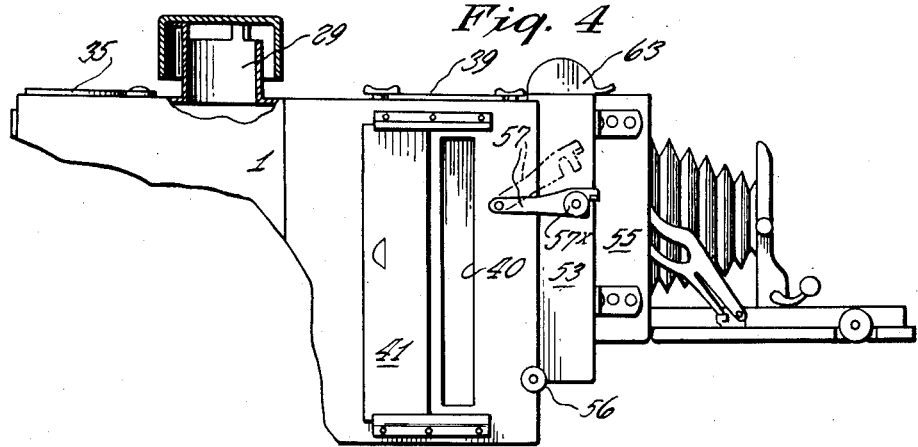
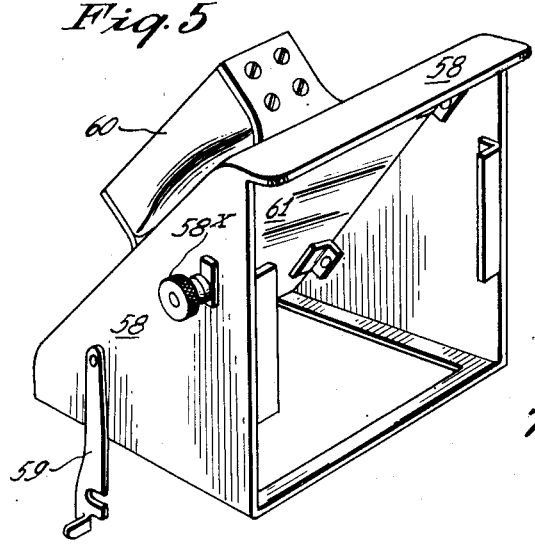
INVENTOR.
Michael P. Kouzminsky
BY
ATTORNEY

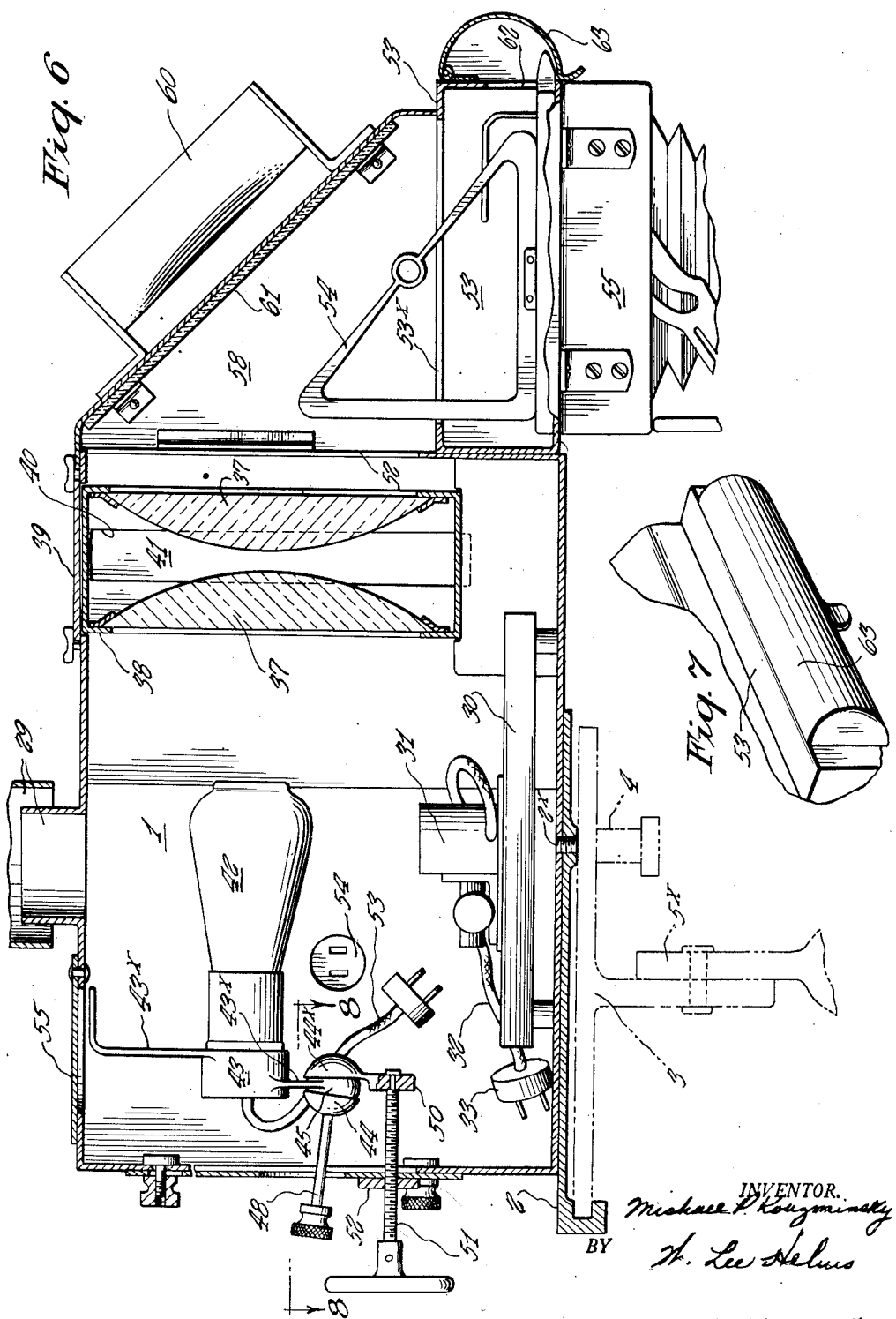

March 21, 1950 M. P. KOUZMINSKY 2,501,469
PHOTOGRAPHIC ENLARGER AND CAMERA
Filed June 19, 1947 6 Sheets-Sheet 5
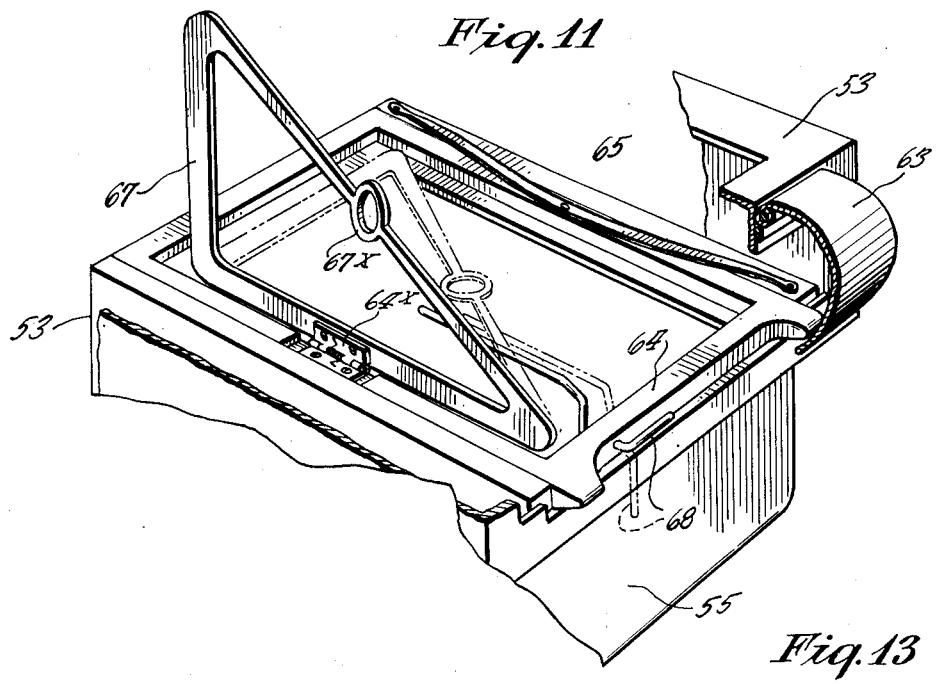
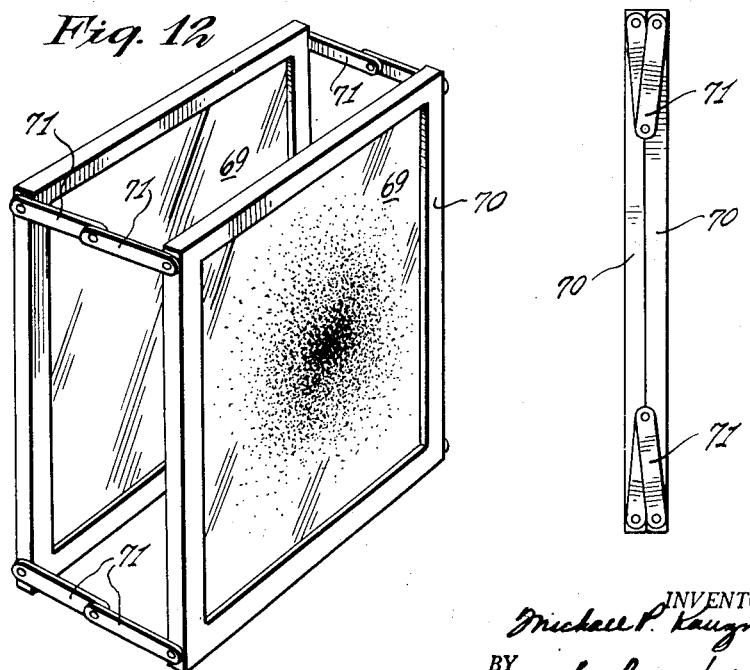
INVENTOR.
Michael P. Kouzminsky
BY H. Lee Helms
ATTORNEY

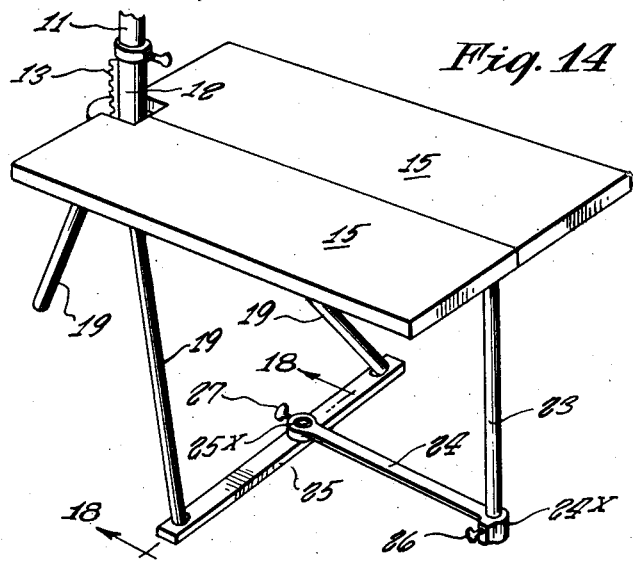
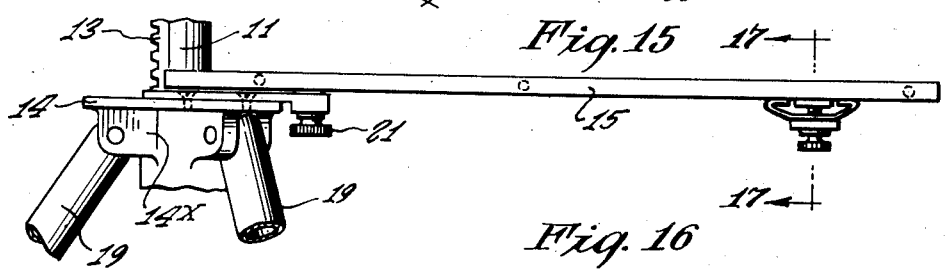
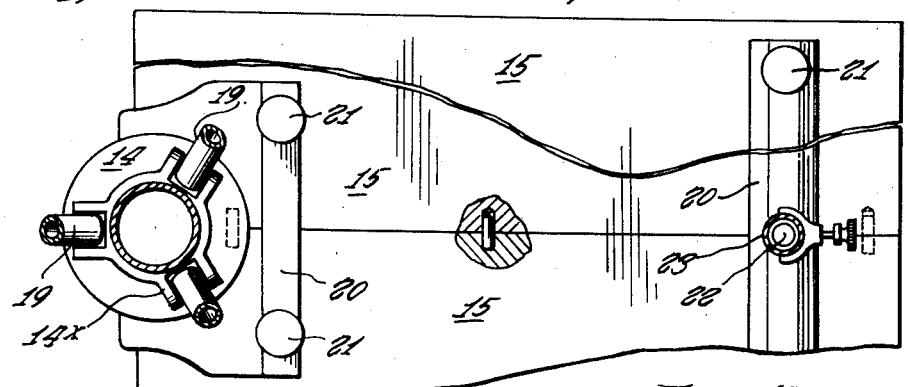
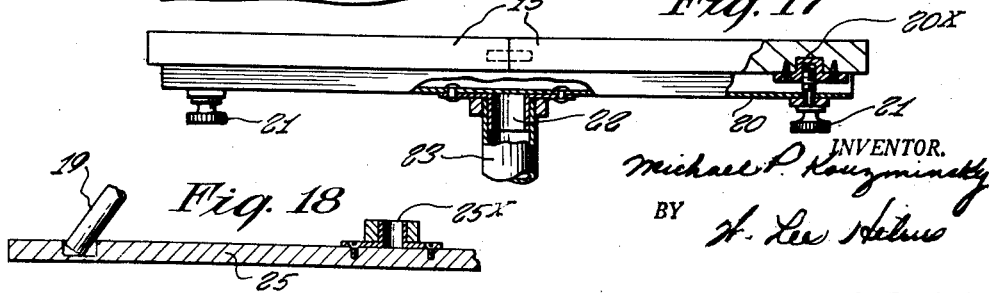

Patented Mar. 21, 1950

2,501,469

UNITED STATES PATENT OFFICE 2,501,469

PHOTOGRAPHIC ENLARGER AND CAMERA

Michael P. Kouzminsky, New York, N. Y.

Application June 19, 1947, Serial No. 755,644

3 Claims. (Cl. 88—24)

The object of the present invention is to provide an enlarger-camera which will be particularly adapted for professional use in the sense that it has wide adjustment for all of the various conditions met with in copying from the horizontal or vertical, for projection to either of the said positions, for focusing, for light beam adjustment, and for meeting many other conditions.

The invention will be described with reference to the accompanying drawings, in which Fig. 1 is a view in side elevation, showing an embodiment of the invention in position for either copying from a horizontal copy or for projection of an image to a horizontally placed sensitized sheet.

Fig. 2 is an enlarged, fragmentary section taken vertically on the line 2—2, Fig. 1.

Fig. 3 is a top plan view showing the structure of Fig. 1, with the forward reflection box removed and the camera element adjusted from vertical to horizontal position.

Fig. 4 is a side elevation of the arrangement shown in Fig. 3, partly broken away.

Fig. 5 is an isometric view of the reflection box partly exposing its interior from the rear.

Fig. 6 is a longitudinal section taken vertically through the structure shown in Fig. 1, the bellows end of the camera being broken away and certain supporting elements being shown in dotted lines.

Fig. 7 is a fragmentary perspective view showing the loading front of the camera mount and the cover member which is elevated for entry or removal of a sensitized film or plate holder.

Fig. 11 is a perspective view partly broken away, showing the film or plate holding mount at the top of the camera per se, and the focusing bracket hinged thereto, together with its operating lever.

Fig. 12 is a perspective view showing spaced diffusion plates and the collapsible connections therefor.

Fig. 13 is a view in end elevation, showing the diffusion plates and mounting collapsed, Fig. 14 is a perspective view, partly broken away, showing the primary supporting standard elements and the collapsible table members.

Fig. 15 is a view in side elevation showing the upper portion of the primary standard, the connection carried thereby for the table, etc.

Fig. 16 is a bottom plan view of the table, the latter being partly broken away, the upper portion of the primary standard being shown, as well as connecting elements for the table, and the forward secondary support therefor.

Fig. 17 is a transverse sectional elevation, in part, taken generally on the line 17—17, Fig. 15.

Fig. 18 is a fragmentary vertical section on the line 18—18, Fig. 14.

Figure 8:
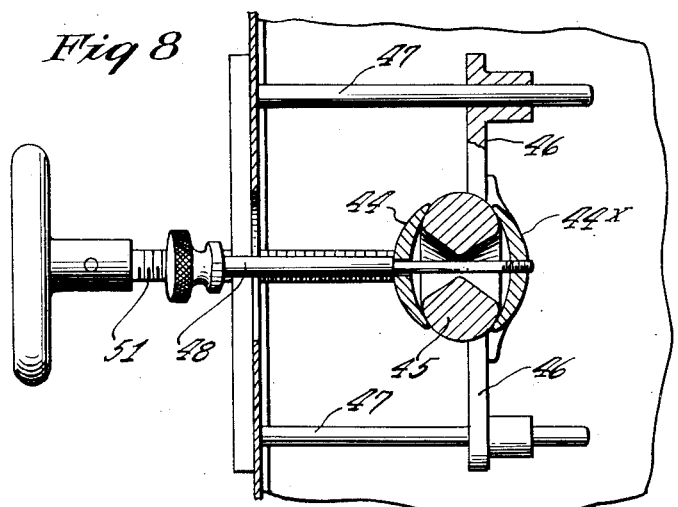
Fig. 8 is a horizontal sectional view taken generally on the line 8—8, Fig. 6, but horizontally intersecting the universal joint for the adjustment of a special lamp.

Referring to Figs. 1, 2, 6 and 7 of the drawings, it will be seen that the embodiment therein shown comprises a lamp house generally indicated at 1, and which is mounted upon a bracket plate 2, which at one end is formed with a depending horizontally channeled portion, by means of which the plate and the members carried thereby may be received upon a pivotal bracket member 3. Plate 2 is provided with a threaded aperture at 2X to receive the threaded end of a holding stud 4, which passes through a suitable aperture in pivoted bracket 3.

Pivoted bracket 3 is formed with a depending nose serrated in confirmation with the serrated head 5X of a lever 5, carrying a worm wheel 5XX, the lever being pivoted at 6 within a yoke 7, which is rotationally mounted a worm 8 adapted to be rotated by a crank 9. Members 3 and 5X are held in adjusted connection by clamping screw 10. By loosening this screw, lamp housing may be adjusted from side to side, with an adjustment of substantially 180°.

Yoke 7 is fixed upon the upper portion of a vertically adjustable shaft 11, which extends downward into a sleeve 12, which will be formed with a vertical slot through which projects a rack 13 connected to shaft 11. In other words, the shaft and the rack may have vertical adjustment relatively to sleeve 12.

As shown more particularly in Fig. 2, the sleeve 12 may be welded or otherwise secured to a tripod head 14 and the shaft 11 may be guided by the sleeve vertically with respect to table 15, the latter having an aperture through which the sleeve passes. The tripod head may provide a bearing for the inner portion of a shaft 16 which may pass through the bearing aperture in a bracket 17 carried by the table, and thence have applied thereto an operating handle 18.

The head 14 may have sets of spaced ears 14X for reception of the tripod legs 19 which are pivoted for limited outward movement and for inward movement, as, for example, to vertical position.

In the present embodiment, the table 15 is in two sections, spaced connecting bars 20 connecting the sections, screws 21 passing through the bars and entering threaded cups carried by the table sections, as shown more particularly in Fig. 17. The outermost connecting bar 20 relatively to the tripod may carry a neck 22 to receive a tubular support 23 which may be held at its base by an arm 24 connected to a cross piece or base member 25, apertured to receive two of the tripod legs 19.

In the present embodiment, arm 24 is formed with an apertured head 24X to receive support 23, a set screw 26 clamping the members together. Also the base support bar 25 may have an upwardly projecting stud 25X to receive the apertured end of bar 24, the latter carrying a set screw 27 to clamp the parts together.

Figure 9:
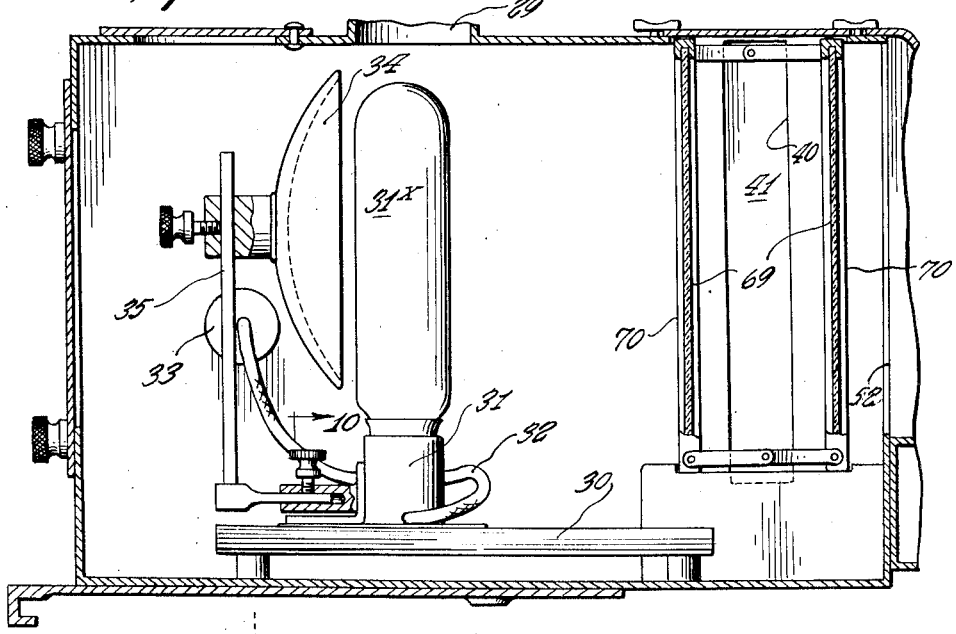
Fig. 9 is a vertical section through the lamp housing, partly broken away, showing the use of a normal lamp and diffusion or filter translucent plates for reception of the beam.
Figure 10:
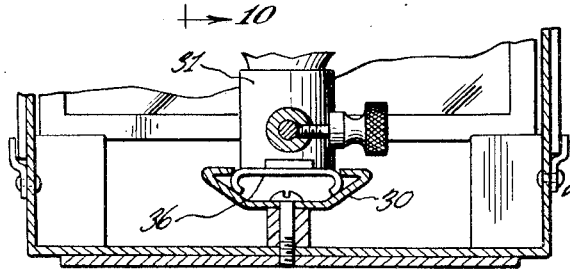
Fig. 10 is a fragmentary vertical section on the line 10—10, Fig. 9.

The lamp housing 1 is provided with a hooded ventilator 29 (Figs. 4 and 6). At its base the housing is provided with a supporting member 30 for a lamp socket 31 having a suitable electrical connection for a source of current, as, for example, the conductor 32 and plug 33. Also, as shown in Fig. 9, a reflector 34 may be adjustably mounted on a rod 35, for both vertical and horizontal adjustment relatively to the lamp. The lamp itself is preferably mounted for horizontal adjustment. To this end the support 30 may be a flanged channel member, as shown in Fig. 10, to slidingly receive the arcuately flanged base of the lamp socket 31. This base may be of spring metal so as to snap into the holder 30. It is indicated at 36, Fig. 10, and by means thereof the lamp may be adjusted forwardly and rearwardly of the condensers or diffusion plates.

In Fig. 6, I have shown the use of condensers 37 mounted in a box or carrier 38, which box may be removed through an opening at the top of the lamp housing, which opening is normally closed by a closure plate 39. At its side and adjacent the normal position of the condensers, lamp housing 1 may be provided with an opening, at 40, Fig. 6, may be closed by a slide plate 41. In practice there would be two openings, one at each side of the lamp housing, each to be controlled by a sliding cover or plate 41. Thus the condensers may be cooled by cross circulation, and the entrance of air will serve to cool the entire interior of the lamp house, draft being established through hooded ventilator 29.

Preferably the lamp housing carries means for holding and adjusting a second and special lamp indicated at 42. This lamp may, for example, be of that type adapted to project one or more high intensity beams confined as to emission to the forward end of the lamp. Thus in some cases this beam, or the plurality of beams, may be of a special wave length and intensity, including the arc beam. Such lamps will be used with condensers and they require nicety of adjustment. To this end, I have shown means for universal adjustment of lamp 42, operable from the top of the casing for securing exact position of the lamp.

In the form shown in Figs. 6 and 8, lamp socket 43 is provided with a depending arm 43X which is carried by a semi-sphere 45, the latter being held between two cups 44, 44X. The latter cup is held by an arm 46 slidingly mounted on rods 47, carried by the lamp house. These rods are clearly shown in Fig. 8, but have been omitted from Fig. 6 for clarity of illustration. Cups 44 may frictionally hold semi-sphere 45 in adjusted position by means of a clamping rod 48. This rod passes through reversely directed conical apertures in semi-sphere 45 and extends within the meeting area of the cones. The aperture in the lamp housing through which clamping rod passes may be annular to permit universal movement of the rod. The end of the clamping rod 48 is loosely threaded in cap 44X so that when the rod is partly unthreaded it may be given said lateral universal movement. Forward and backward adjustment of the lamp 42 is provided through the use of a depending arm 50 carried by semi-sphere 45, which arm is rotationally connected to an adjusting screw 51 threaded in a small plate 52 carried by the casing below member 48. Socket 43 may be provided with an electrical conduit 53 adapted to be inserted in a plug 54 carried by the lamp housing, the plug being double in the sense that from the exterior of the lamp housing, it may receive the plug of a conduit leading to a source of current.

For adjusting the position of the special lamp 42 from a point exterior the lamp housing, its lamp socket may carry an adjusting lever 43X (Fig. 6) having a handle below an opening which may normally be closed by a pivoted plate 55 at the top of the lamp housing.

It has heretofore been stated that the lateral openings 40 in the lamp house may be used for admitting air for cooling. These openings may also be employed in the insertion and removal of filter elements.

Pivoted to the front of the lamp housing in front of its opening at 52 is a box 53 for reception of film or plates and for carrying a focussing element 54.

Box 53 also is employed as a carrier for a camera 55 which preferably has an adjustable bellows with the usual lens (not shown), the camera being adapted for projection or normal camera use. Box 53 is provided with spaced ears as indicated at 53X, Fig. 1, to receive studs threaded at their ends so as to be threaded to the sides of the casing, one of the studs being indicated at 56, Fig. 1. Thus the camera box may be swung to the position of Fig. 4 and there held by a latch 57, for horizontal projection and enlarging or for film exposure in normal picture taking. Also, for like purposes the camera box 53 may be moved horizontally to the position of Fig. 1 for copying or projection in conjunction with a reflector box 58.

In the present embodiment, reflector box 58 is triangular. Its sides carry latch studs 58X to be engaged by the latches 57 (Fig. 1), and its sides also carry latch arms 59 adapted to engage the latch studs 57X on the camera box 53. For ready manipulation, a handle 60 is provided.

The forwardly inclined wall reflector box 58 carries a reflector 61 shown more particularly in Figs. 5 and 6. Referring to Fig. 6, it will be seen that a beam thrown through the condensers 37 will be angularly directed and thrown down through the camera box 53 to the lens of the camera for enlarging an image held by a negative film or plate in the camera box, the latter having an opening at 53X in its top and an opening in its base. The camera box 53 is formed with a front opening at 62, Fig. 6, normally closed by a hinged cover 63. The base of the box receives a pressure frame 64 to which may be applied springs, such as indicated at 65, Fig. 11. Thus the pressure frame may be raised sufficiently to admit below it either a negative or a sensitized sheet as the condition requires. Of course, image plates or sensitized plates, likewise may be held in position by the frame.

There is hinged to frame 64 at 64X a focusing member 67 which is in the form of a triangle, one of the legs of the triangle being formed as a ring 67X at its center. Hinge 64X is a spring hinge normally holding the member 67 downward in the dotted line position, Fig. 11, a lever 68 having an end passing through an aperture in the front of frame 64, being operable to raise member 67 to neutral position, as shown in full lines, Fig. 11.

In the arrangement shown in Fig. 9 the lamp socket 31 holds a lamp having the characteristics of the General Electric lamp identified as "Mazda" 31X, and therefore it is possible to use with such a lamp spaced diffusion plates 69. As shown in Fig. 12, these plates may be held by frames 70 connected by mutually pivoted links 71 so that the frames may be extended to the position in Fig. 12 or brought into mutual contact for space saving as shown in Fig. 13.

It will be seen from the above that the device provides for all of the conditions normally met with in either professional or advanced amateur photographic work. When the ensemble is in the position of Fig. 1 and light is thrown upon copy carried by the board 15 a sensitized sheet or plate may be placed in position in the camera box 53 and a negative may be made of the copy. The reflector box 58 may be quickly detached and the camera box raised to the position of Fig. 4 for photographing any object, and wide adjustment is provided. The assembly may be arranged as in Fig. 1 and vertical enlargements may be produced. The assembly may omit the reflector 53 and horizontal enlargements may be produced. Either the condensers or diffusion plates may be employed together with a standard lamp, a special condensed arc lamp as in the case of the lamp 42, and either of the lamps may be given wide adjustment. Furthermore the device is portable and the table 15 with its supports and those for the tripod arrangement may quickly be collapsed for packing in small space.

It will be understood that various modifications may be made in the form and arrangement of the elements constituting the embodiment illustrated in the drawings without departure from the spirit of the invention, what I claim and desire to secure by Letters Patent, being as follows:

1. A camera projector comprising a lamp house having a lamp receiving and beam controlling means therein and provided with an aperture at its front wall, a camera supporting box pivoted to the front of the lamp housing and adapted for relatively vertical and horizontal positions, and a reflector adapted for interposition between the lamp housing and the camera box, means being provided in the camera box for holding photographic negatives and sensitized media, whereby a camera held by the box may be employed for projection vertically and horizontally, and for sensitized media exposure in either of said positions, means carried by the lamp house for adjustment of the lamp receiving means, and a second lamp support within the housing adapted for bodily adjustment of a lamp socket longitudinally of the lamp housing.

2. A camera projector comprising a lamp house having a lamp receiving and beam controlling means therein and provided with an aperture at its front wall, a camera supporting box pivoted to the front of the lamp housing and adapted for relatively vertical and horizontal positions, and a reflector adapted for interposition between the lamp housing and the camera box, means being provided in the camera box for holding photographic negatives and sensitized media, whereby a camera held by the box may be employed for projection vertically and horizontally, and for sensitized media exposure in either of said positions, the lamp receiving and beam controlling means consisting of two lamp supports, means for adjusting each of said supports longitudinally of the lamp house and means for adjusting one of said supports universally.

3. In a camera projector comprising a lamp house having a lamp receiving and beam controlling means therein and provided with an aperture at its front wall, the combination of a camera supporting box pivotally held at the front of the lamp housing and adapted for relatively vertical and horizontal positions, and a removable generally triangular reflector-carrier adapted for interposition between the lamp housing and the camera box, and providing an upper downwardly inclined wall provided on its inner face with a reflector element, means being provided in the camera box for holding photographic negatives and sensitized media, a latch member carried by the lamp house at its front area, a latch carried by the camera box and positioned and adapted for co-action with both of said latch members alternately and in accordance with either horizontal suspension of the camera box by the reflector-carrier or vertical support of the camera box by the lamp housing whereby a camera held by the box may be employed for projection vertically, and also horizontally upon removal of the reflector-carrier, the camera being thereby adapted for sensitized media exposure in either of said positions.

MICHAEL P. KOUZMINSKY.

REFERENCES CITED

The following references are of record in the file of this patent:

UNITED STATES PATENTS

| Number | Name | Date |
|---|---|---|
| 1,346,319 | Konieczny | July 13, 1920 |
| 1,712,854 | Thonet | May 14, 1929 |
| 1,743,311 | Biedler | Jan. 14, 1930 |
| 2,253,200 | Wolfson | Aug. 19, 1941 |
| 2,275,687 | Schubert | Mar. 10, 1942 |
| 2,324,842 | Huebner | July 20, 1943 |